(12) United States Patent
Brown et al.

(10) Patent No.: US 7,280,885 B1
(45) Date of Patent: Oct. 9, 2007

(54) METHOD AND APPARATUS TO RECONCILE RECIPE MANAGER AND MANUFACTURING EXECUTION SYSTEM CONTEXT CONFIGURATIONS (75) Inventors: Russell Clinton Brown, Austin, TX (US); Thomas P. Jackson, Bastrop, TX (US); Ronald Ivan Savage, II, Austin, TX (US); Achim Felber, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 406 days.

(21) Appl. No.: 11/001,483

(22) Filed: Dec. 1, 2004

(51) Int. Cl.
*G06F 19/00* (2006.01)
(52) U.S. Cl. ........................ 700/121; 700/96
(58) Field of Classification Search ................ 700/121, 700/110, 108, 105, 96
See application file for complete search history.

(56) References Cited

U.S. PATENT DOCUMENTS

| | | | |
|---|---|---|---|
| 6,035,293 A | 3/2000 | Lantz et al. .................... 707/1 |
| 6,430,572 B1 | 8/2002 | Steffan et al. ........... 707/104.1 |
| 6,735,493 B1* | 5/2004 | Chou et al. .................. 700/121 |
| 6,748,288 B2* | 6/2004 | Su et al. ...................... 700/108 |
| 2005/0228765 A1* | 10/2005 | Huang et al. .................. 707/1 |

OTHER PUBLICATIONS

PR Newswire "New KLA-Tencor Web based Recipe Management Service Enables Increased Productivity and Lower Cost of Ownership" Jun. 2001, p. 1.*

\* cited by examiner

*Primary Examiner*—Leo Picard
*Assistant Examiner*—Steven R. Garland
(74) *Attorney, Agent, or Firm*—Hamilton & Terrile, LLP; Gary W. Hamilton (57) ABSTRACT

A method and apparatus for managing recipes in a semiconductor manufacturing process. Recipes and associated process contexts in a manufacturing execution system and corresponding recipes and associated contexts in a recipe management system are audited to identify discrepancies. The discrepancies are reconciled to ensure that compatible recipes and process contexts are maintained in the manufacturing execution system and the recipe management system. The audit and reconciliation process can be initiated automatically at predetermined time intervals or can be initiated interactively by a user of the manufacturing system.

20 Claims, 11 Drawing Sheets

METHOD AND APPARATUS TO RECONCILE RECIPE MANAGER AND MANUFACTURING EXECUTION SYSTEM CONTEXT CONFIGURATIONS

BACKGROUND OF THE INVENTION

1. Field of the Invention

The present invention relates generally to semiconductor manufacturing systems and, more particularly, to a method and apparatus for managing recipes used to control semiconductor manufacturing equipment.

2. Description of the Related Art

Semiconductor manufacturing equipment is often controlled by a recipe, or process program, that precisely controls its operation during the manufacturing process. These recipes are crucial to the proper manufacturing of product, so it is highly desirable that known good recipes be kept in a secured, version-controlled repository. Such a repository is called a recipe manager.

The manufacturing execution system (MES) is the centralized control for moving semiconductor wafers through the various processing tools. The MES and the recipe manager coordinate the use of various recipes to provide instructions to the processing tools. Keeping the MES and the recipe manager synchronized manually is a daunting task and transcription errors resulting from manual synchronization can be extremely costly. The initial setup of a recipe manager is also critically important but is long, tedious, and error-prone. For example, when a new product is added to the MES, all of the process steps on that product's process will need to be entered into the recipe manager.

Some recipe managers have attempted to implement a "tap" mechanism to facilitate the synchronization of recipes. While such a system can be implemented, it requires a lengthy initialization step when the tap is first activated to obtain the starting set of data. Moreover, taps generally require extensive modification of the specific recipe management software and the tap is useless in any other context. There is no general means for tapping an MES that works for many customers.

There is a need for a simple and reliable method and apparatus for initializing, auditing and reconciling changes in context data between the manufacturing execution system and the recipe manager.

SUMMARY OF THE INVENTION

The present invention provides a method and apparatus for initializing, auditing and reconciling changes in context data between the manufacturing execution system and the recipe manager. Recipes and associated process contexts in a manufacturing execution system and corresponding recipes and associated contexts in a recipe management system are audited to identify discrepancies. The discrepancies are reconciled to ensure that compatible recipes and process contexts are maintained in the manufacturing execution system and the recipe management system. The audit and reconciliation process can be initiated automatically at predetermined time intervals or can be initiated interactively by a user of the manufacturing system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1A:
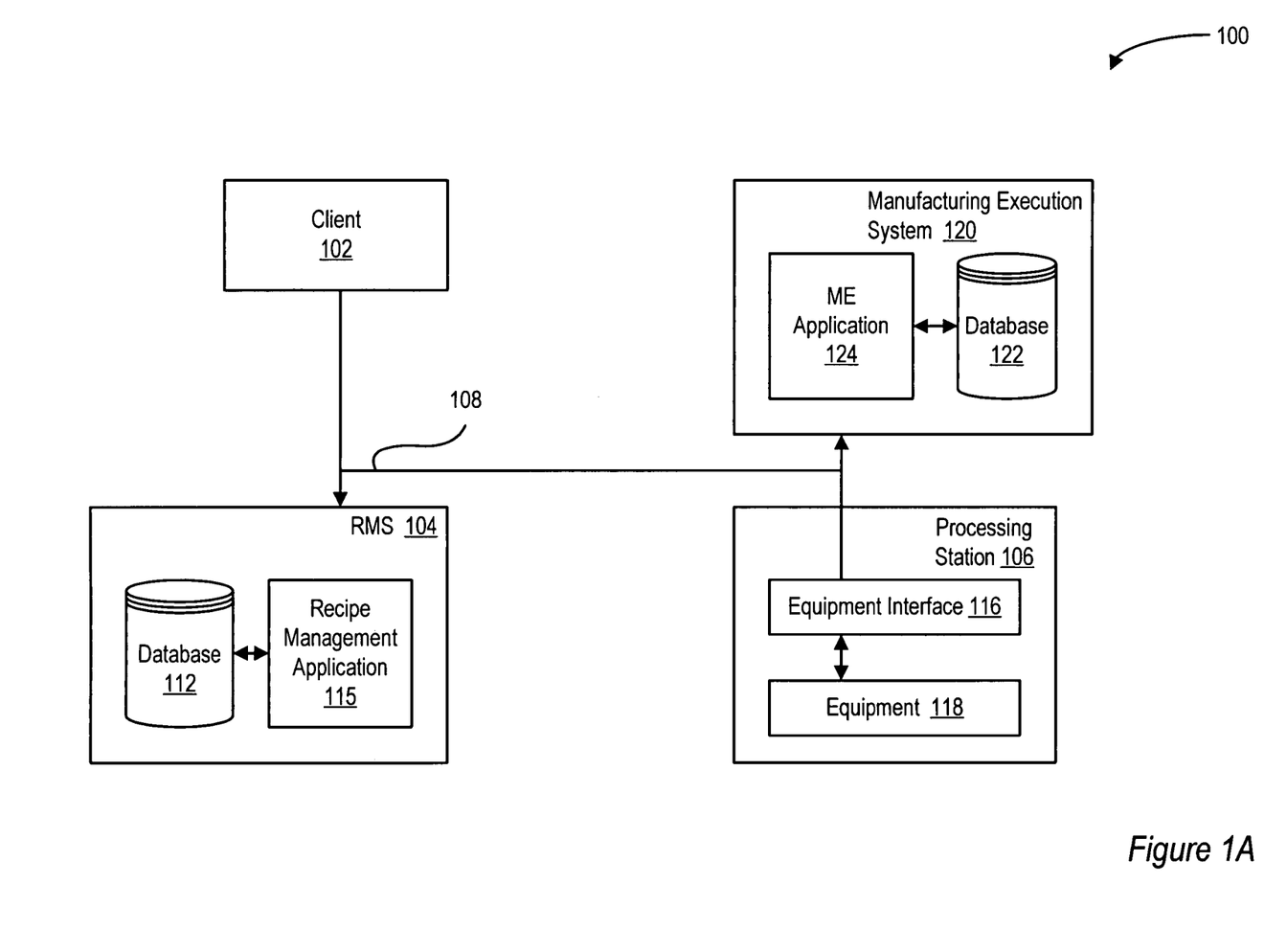
FIG. 1A is a block diagram that illustrates a conventional process management system.

Referring to FIG. 1A, a processing arrangement 100 is shown which includes a client 102, a recipe management system (RMS) 104 a manufacturing execution system (MES) 120 and at least one processing station 106. Client 102, RMS 104, MES 120 and processing station 106 are coupled via communication bus 108. The processing arrangement uses a plurality of recipes stored in RMS 104 to control the manufacturing process.

Figure 1B:
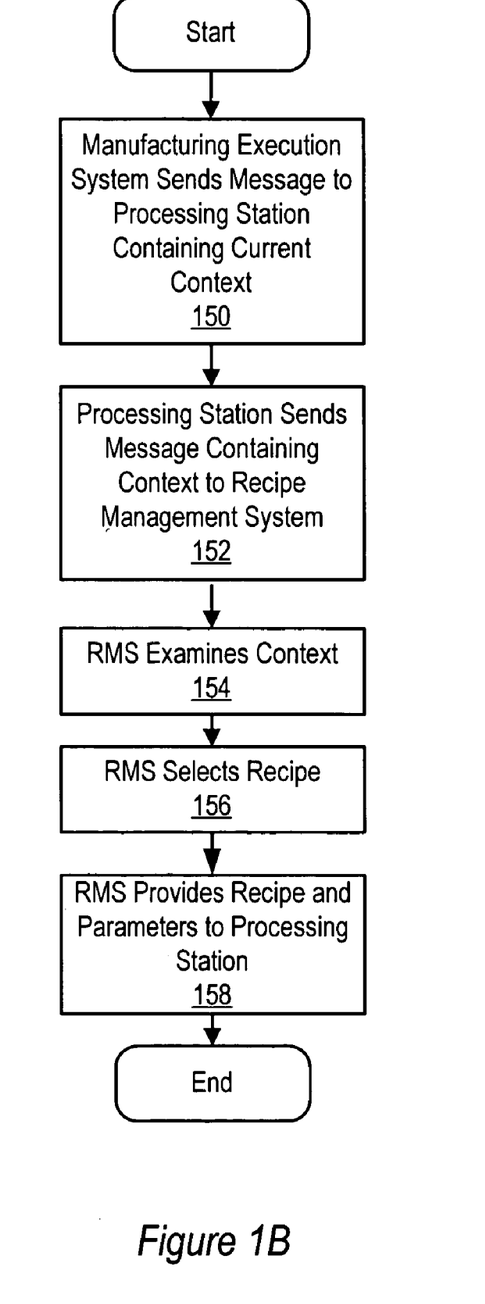
FIG. 1B is a flowchart illustration of the sequence of steps used by the processing arrangement of FIG. 1A during the manufacture of a semiconductor.

FIG. 1B is an illustration of the sequence of steps used by the processing arrangement of FIG. 1A to coordinate the use of a recipe in the manufacturing of semiconductors. In step 150, the MES 120 sends a message to the processing station 106 equipment containing, among other things, the current processing "context." In general terms, the context is a series of character strings that identify the material to be processed, the step in the manufacturing sequence corresponding to a particular process, the identity of the tool, and other implementation-dependent values. In step 152, the processing station 106 sends a message to the RMS 104 containing the context. In step 154, the RMS 104 examines the context and proceeds to step 156 to select the appropriate recipe body and parameters to use. In step 158, the RMS provides the recipe and parameters to the processing station 106. The interaction of each of these system components and processing steps will be described in greater detail hereinbelow.

In the sequence described in FIG. 1B, the MES 120 and the RMS 104 should be in agreement with regard to both the context and the associated recipe. Specifically, the context provided by the MES 120 should have a recipe configured for it in the RMS 104 so that the proper recipe can be provided. The context information in the MES 120, however, changes on a daily basis. For example, new steps may be added to existing processes, new processes may be created, new tools may be installed and process flows may be renamed, etc. Those changes must somehow be reflected in the RMS 104 so that the RMS 104 and the MES 120 are in agreement as to how product should be manufactured.

Referring again to FIG. 1A, the RMS 104 includes a database 112 as well as a recipe management application 115. Database 112 is a form of persistent storage; Other storage may be used such as separate file storage. Database 112 includes database system files and data files stored on a non-volatile storage medium, such as one or more disks. The data files include one or more recipes used with processing station 106 to perform processing steps on a wafer. Database 112 also stores context information that is used during wafer processing. Context information uniquely identifies each process step in the process, such as lot number, product, route and other similar information.

The recipe management application 115 includes an advanced recipe management object repository which includes an algorithm that allows a recipe manager application to determine parameter settings dynamically when the parameter settings are requested and that transforms the parameter setting into any format that an equipment interface desires is set forth. The algorithm also performs the selection of recipes and variable parameters according to a current processing context.

The algorithm includes a resolve stage and a render stage. In the resolve stage, the configuration for a current context is collected and dynamic values in the current context are determined. In the render stage the resolved configuration is transformed into a format suitable for consumption by equipment interfaces via a rendering module.

Processing station 106 includes an equipment interface 116 for providing communication between processing station 106 and communication bus 108. Processing station 106 also includes equipment 118 for performing a processing step on a wafer. To perform a process step, processing station 106 requests a recipe from RMS 104. After receiving the recipe, processing station 106 performs the processing instructions specified in the recipe to complete the particular processing step.

Processing arrangement 100 includes a manufacturing execution system (MES) 120 for tracking the overall processing of wafers. Manufacturing execution system 120 is coupled to communication bus 108 and includes a database 122 and a manufacturing execution application 124. Database 122 includes database system files and process data files stored on a non-volatile storage medium, such as one or more disks. One type of file is the specification. The manufacturing execution system 120 may be, for example, an advanced process control (APC) system.

Typically, an expert user uses the MES 120 to configure which contexts to use to process specific material in the factory. The same or another expert user also uses client 102 to associate recipes with contexts in RMS 104. Later, the MES 120 instructs equipment interface 116 to begin processing material. The MES 120 provides the current context as part of those instructions. The equipment interface 116 then uses communication bus 108 to transmit the current context to the RMS 104. Database server 114 examines the context to determine the appropriate recipes to use and then retrieves those recipes from database 112. The recipes are then returned to the equipment interface 116 via communication bus 108.

The recipe management application 115 includes an advanced recipe management object repository which includes an abstract data type. The abstract data type models an organizational hierarchy of process definition elements. The recipe management application 115 includes user-configurable selection logic within that hierarchy to allow selection of process definition elements based on manufacturing cycle context.

The recipe management application 115 includes a transaction processing server for selecting and providing those process definition elements to systems that request the process definition elements.

In the recipe management application 115, there is no mention of recipes, equipment, manufacturing execution systems, or any other domain-specific concept within the code of the application. All of the major domain concepts with which the recipe management application 115 works are potentially inconsistent from site to site and thus are considered unknowns. The design of the recipe management application 115 is therefore abstract.

The recipe management application 115 is modeled after a file system like a Windows Explorer type file system. Users are free to create, read, update and delete directories. The file system includes files that a user puts there, and the file system knows how to copy and delete the files. The format of the files may vary and the file system may not understand any of those formats, so the file system cannot create or update these files. The file system does know, however, what programs to call when the user wishes to manipulate those files.

The recipe management application 115 provides and interacts with a storage context which may be located e.g., in the database 112. The recipe management application 115 enhances the file system by introducing a transaction processing component. The transaction processing component provides the recipe management application with the ability to provide files to requestors using dynamic criteria such as location within the manufacturing cycle. The recipe management application 115 may maintain a history of transactions and includes tools for managing the history of transactions.

Figure 2:
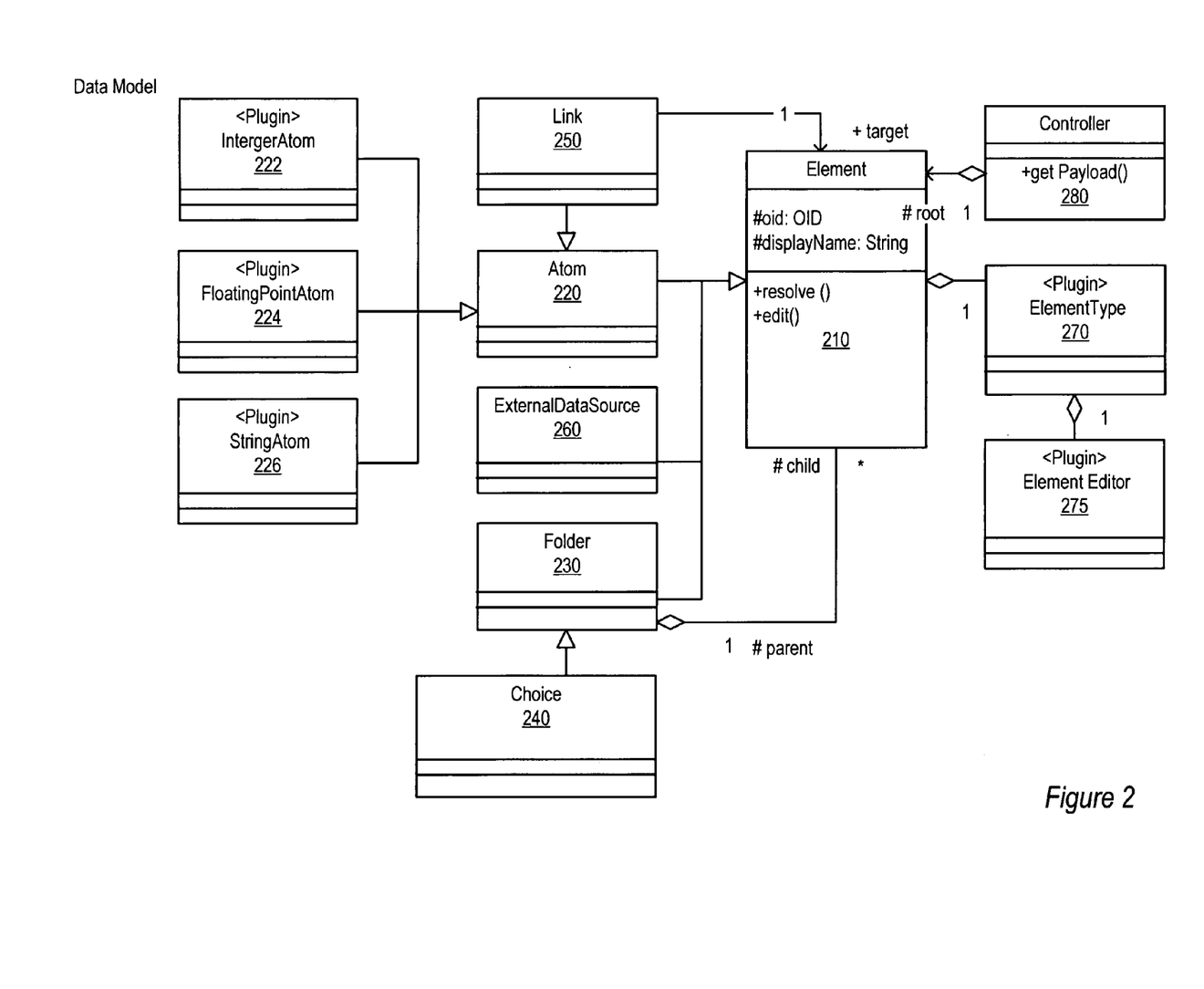
FIG. 2 shows a block diagram of a data model for the recipe management application.

Referring to FIG. 2, the fundamental data structure of the recipe management application 115 is an n-ary tree. With the n-ary tree of the recipe management application 115, data is stored in nodes. Some nodes have one or more subordinates to them called children. Nodes that have children are called branches. A branch is considered the parent of its children. A parent is an ancestor of its children, its children's children, its children's children's children, and so on, and those children are all descendents of that parent. Some nodes have no children. Such nodes are called leaves. One node is considered the root of the tree. Every node is a descendent of the root, and the root is the ancestor of every node. Each node has exactly one parent.

A file system organized in this manner has a plurality of properties. Some of the properties are: directories are branches and files are leaves; deleting a directory deletes it and all of its descendants; which branch serves as a leaf's parent can be changed, which is analogous to moving a file; each directory serves as a namespace within which files must have unique names. However because the same name can be reused in different directories, uniquely identifying a file requires knowledge of its ancestry all the way up to the root (i.e., a full path).

All of these statements about both n-ary trees and file systems are true of the data model of the recipe management application. However, the terminology is slightly different to reflect the different usage of the recipe management application. More specifically, the transaction processing aspects of recipe management application are dynamic features that have no clear analogue in the file system metaphor.

An element 210 is the fundamental object in the recipe management application data model. The element 210 is the node in the n-ary tree. In UNIX file systems, directories are generally represented as a special type of file. Elements 210 are analogous to UNIX files as they may be ordinary files or containers of other files.

An element 210 is the superclass of all things in the recipe management application data model. The element 210 is an abstract superclass as users cannot create one. All elements 210 are versioned.

Every element 210 has a type. The element type determines how the element is displayed and modified within the recipe management application. Each distinct recipe format has its own element type. The other elements also all have element types, though some of them (such as the folder) are not modifiable by the end user.

Atoms 220 are similar to the leaves in an n-ary tree. In the recipe management application data model, an atom 220 is an opaque and indivisible chunk of data. The recipe management application 115 can move and delete atoms 220, but creating and updating atoms 220 is left to specific programs that understand them.

The atom 220 is a kind of element. Atoms are leaves and thus cannot have children. Atoms are also abstract; specializations of the general atom (e.g., 222, 224, 226) are necessary to do anything useful. For example, a single recipe body is an atom as is a recipe parameter.

Folders 230 are like branches in the tree or like directories in a file system. Folders 230 are a kind of element. Folders 230 in the recipe management application data model are containers of elements (which may in turn be folders).

In the hierarchy of setup within the recipe management application 115, certain elements pertain only to particular steps in the manufacturing cycle. The certain elements may also pertain only to specific tools or particular product lines. For example, when equipment interfaces request recipes at runtime, the configuration of these context dependencies must be consulted so that the proper recipe or set of recipes is provided to the equipment interface.

The recipe management application 115 allows the creation of a special kind of folder whose contents are only provided to requesters when the context the requester provided has a specific value in a specific field. The context is a collection of values associated with names. Each name identifies a field of context. This folder is called a context choice 240. The user can create a context choice that states, for example, that operation in the current context must equal 2095. When the context choice is examined at runtime, the contents of the folder are provided to the equipment interface only if the context the equipment interface sent contained the value 2095 in the operation field.

When the user indicates a desire to create a context choice, it is the option of the user to have a set of choices created automatically to correspond to the available context values obtained from another system, frequently the MES 120. For example, when one creates a choice to examine operation, the recipe management application 115 provides the user with the option to create a choice for all of the operations in the MES 120. Wildcards and multiple fields of context within a single choice are extensions to the context choice.

The recipe management application setup hierarchy provides for reuse. A method of reuse, copy and paste, is provided within the recipe management application data model. With a copy and paste, however, the new copy is divorced from the original and does not pick up any changes to the original.

The recipe management application data model provides an element called a link 250. The link 250 is a "pointer" to another element. When recipes are chosen at runtime, the link 250 is indistinguishable from the element to which the link 250 points; the link 250 and the recipe are differentiated only at configuration time. Links 250 may refer to specific versions of the target elements of the link 250 or to the latest effective version of the link 250, whatever that happens to be at runtime.

Some elements can be defined as having a value that the recipe management application 115 obtains from another system at runtime. Such a definition allows integration between an APC system (e.g., MES 120) and the recipe management application 115. The recipe management application 115 may request values from the APC system when the affected parameter has been requested by an equipment interface 116.

An extension of this type of link is to provide parameters whose settings are calculated at runtime within the recipe management system 104 rather than being queried from another system. Such a calculation provides relatively simple advanced process control.

The recipe management application 115 uses plugins as a way of inserting site-specific behavior into the recipe management system. A plugin is, e.g., a Java bean that users can write and install. It is likely that many plugins will be written as part of an initial site installation of the recipe management application 115. In one embodiment, the recipe management application vendor would perform this task or assist with it.

Each element type 270 specifies a plugin that serves as the element editor 275 for that element type. The element editor has a graphical component that appears in the right pane of a recipe management application explorer view. This graphical component provides the user interface for viewing and modifying the contents of the element, whether the element type is a recipe body, parameter, choice, link, folder, or any other kind of element.

The element editor also provides methods for modifying the contents of the element via programming. This allows, for example, the ability to set a parameter within a recipe body from an advanced process control system without involving the user.

The recipe management application customers will likely encourage vendors to provide element editors written to that interface when they deliver tools. The recipe management application vendor may provide services for writing these element editors to work with specific tools.

Any external program may be invoked by the plugin element editor, for example, specifications can be written in Microsoft Word and managed in the recipe management application 115 no differently from recipes. One example of an element editor would be the Recipes and Parameters SEMI task force (RaP) standard editor.

Because context fields and their contents may be different from site to site, the context received at runtime is considered opaque by the recipe management program. When the recipe management program resolves a context choice element, the recipe management program invokes a plugin context extractor for the field within the context choice element that is accessed via a different plugin. Using a plugin context extractor allows the recipe management application to remain independent of the context used at a specific site or within a specific product.

Context extractor plugins may be written that do more than simply extracting a string from a context. For example, equipment type, which is missing in the equipment context that a WorkStream program provides, may be extracted using a context extractor. An equipment type context contractor plugin may be written that returns the equipment type from a WorkStream context by examining entity and consulting a lookup table. The core configuration of the recipe management application 115 does not have to know that equipment type is not really in the context; the plugin encapsulates the knowledge of the equipment type.

An external data element retrieves data from a system other than the recipe management application 115. Systems in typical semiconductor fabs, however, use a broad variety of middleware and interface styles. Some external data elements may be resolved using a database query, while others might require a message with specific parameters.

Each external system is accessed in the recipe management application via a plugin called a data source medium. The data source medium plugin is generalized to the medium through which communication takes place. Specific systems are configured as data sources that use data source media with specific parameters (e.g., SQL query, host and port) to communicate with the external system. Such a system addresses the uncertainties in the integration of APC systems, MES systems, and others to the recipe management application 115.

One mode of management the recipe management application 115 provides is the management of configuration changes in the system. Security of transactions and appropriate notification and approval of their effects are important to preventing mistakes that cause misprocessing.

Another means for ensuring that changes in the recipe management system are seen by and approved by the appropriate individuals is signoff. Changes that users make to the system are in a "pending" state (i.e., the changes have no effect on the runtime behavior of the system) until the changes have been circulated through a signoff loop using an approval request. The signoff loop may include a number of tiers. Each tier lists users either directly by name or indirectly by role, and each tier has an approval policy (majority, unanimous, veto, etc.).

In some existing fabs, some recipes are reverse-engineered and modified at the byte level to enable APC. The recipe management application 115 enables this function. The recipe management application 115 provides this function via an element editor called a byte offset recipe editor that works on any element type. This element editor allows the user to create a list of offsets and formats of known values in the recipe body. The recipe management then permits the user to either interactively or programmatically change those parameters. The offsets and formats are highly specific to the tool software version that generated the recipe body, but byte offset recipe editor capability is available as a last resort.

Byte recipe offset editor is implemented like other element editors as a plugin. The fix plugin may be is provided as part of the recipe management application 115.

New models of equipment and new software revisions on existing equipment are often deployed into an existing semiconductor fab. The recipe management application 115 uses recipe editors for the new formats that can be written and placed into existing installations. Over time, the library of element editors may have significant value to the users of the recipe management application.

Just as 300 mm manufacturing created an acute need for wafer-level control, larger geometries and more intricate processes of the future may demand even more finely-grained control. Because the recipe management application 115 does not predefine the fields of context that are used, context in the recipe management application 115 can be as coarse or detailed as desired. The fields of context can even be easily augmented in a running, installed system.

As more and more process control software systems become available to the semiconductor manufacturer, more and more integration effort undertaken to install the process control software system into running semiconductor fabs. The recipe management application 115 can make this process easier by centralizing APC access to process settings and reducing the amount of EI integration. The recipe management application 115 integration with APC is straightforward because the interface is a plugin.

Figure 3:
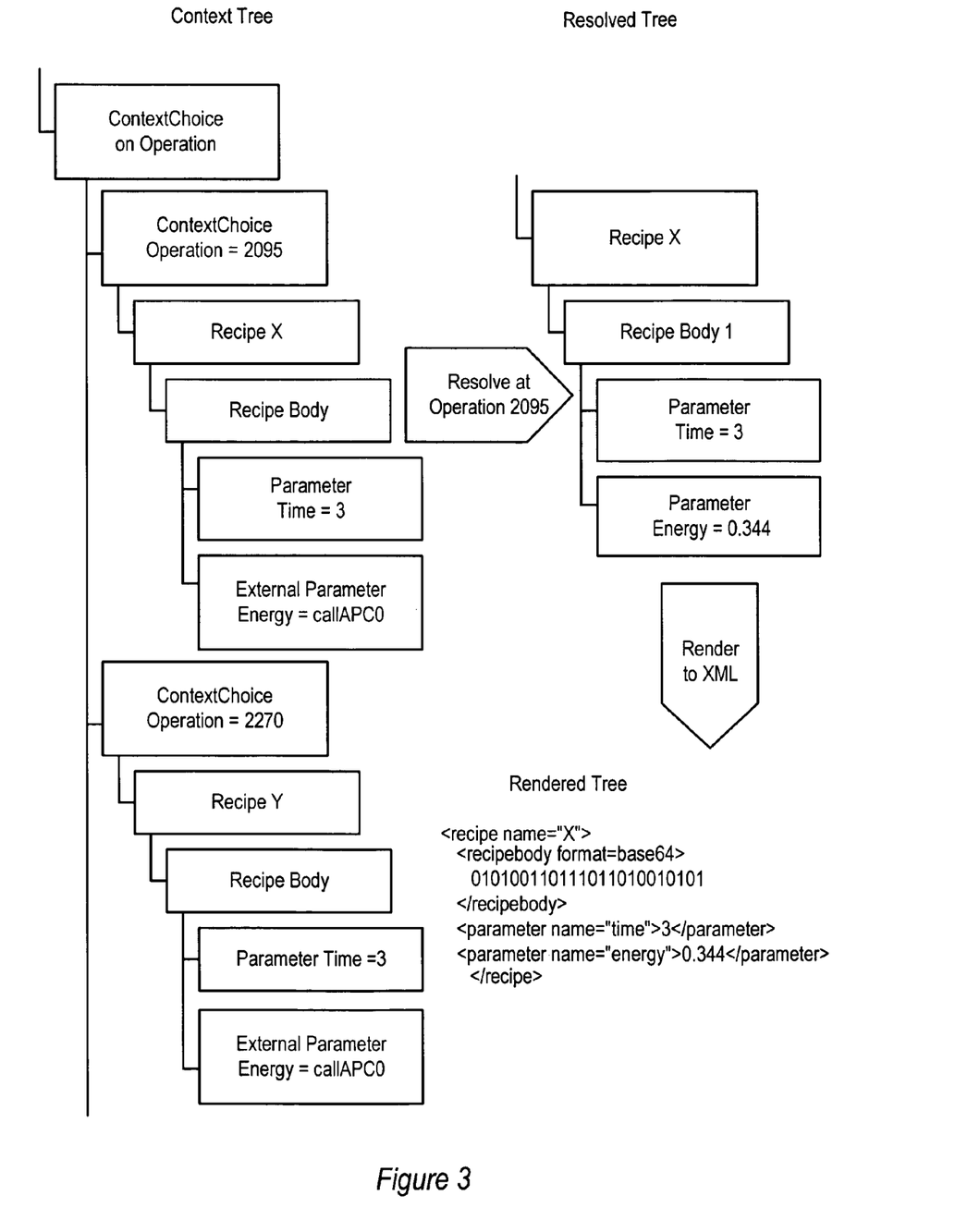
FIG. 3 shows a flow chart of the operation of the resolve render process of the recipe management application.

Referring to FIG. 3, providing the correct set of recipes and parameter settings to an equipment interface 116 at the time that the equipment interface needs to perform processing is a key behavior that the configuration items enable. That set of recipes and parameter settings is referred to in the recipe management application 115 as the payload.

The payload in the recipe management application 115 is constructed using a two-phase approach. First, the payload is resolved. The recipe management application 115 starts with a particular folder (the context root of the context tree, chosen by the application administrator) and assumes that everything below the folder should be provided to the equipment interface 116. The recipe management application 115 performs a pre-order traversal of the context tree starting with the context root. Each element encountered is added to the payload. Choices on context, however, restrict the contents of the payload to only content pertinent to the current context. Calls to external systems to get external data element values are made. Links are followed. The procedure ends with a hierarchical subset of the context tree containing recipe bodies and the parameter settings to be sent to the equipment. This hierarchical subset of the context tree is called a resolved payload.

The resolved payload is then rendered. The rendering process transforms the resolved payload and translates each element encountered into the marshalling format expected by the equipment interface 116. For example, one method of rendering a payload might be to translate the resolved payload into XML. This rendered payload is provided to the equipment interface.

More specifically, in the resolve stage, the configuration for a current context is collected and dynamic values in the current context are entered. In the render stage the resolved configuration is transformed into a format suitable for consumption by equipment interfaces via a rendering module.

When a payload is to be generated, a new resolver is created with the root of the context tree as its origin. The new resolver builds a new tree whose contents are the result of calling resolve( ) on each node. That method returns a resolved version of the original object. For StringElement, FloatElement, BLOBElement, and other static types, the element itself is returned. For a Folder element, the element itself is returned. For a Choice element, a new Folder is returned containing only the children applicable to the context.

The new Folder is then resolved. If a resolved element returns a pointer to a different element, the different element is resolved, otherwise, the traversal continues. For a link, the target element is returned (which is then resolved). For an external system call, the system is called and returns a static atomic element containing the results of that call to the other system. The new tree that results from resolving contains only simple folders and atomic types and is suitable for rendering.

The resolve method for containers resolves attributes of only the container itself (nothing is applied to the children, and the resolved container contains no children). A child may choose to become nothing when it's resolved, so the resolved folder may have a different set of children from the original.

The render stage includes another preorder traversal of the resolved n-ary tree. Each node in the traversal is provided in turn to a plugin renderer. The plugin renderer is installed into the recipe management application 115 at a user's site, so the user can have the renderer transform the tree into any format desired by the equipment interfaces as the traversal progresses.

The renderer also may watch for and transmit important values to other systems. For example, a renderer may be written that watches for specific values in specific variables and sends notifications to an APC system when the specific values are encountered. Additionally, the renderer may write the specific values to a history stored in a user-defined database.

Figure 4:
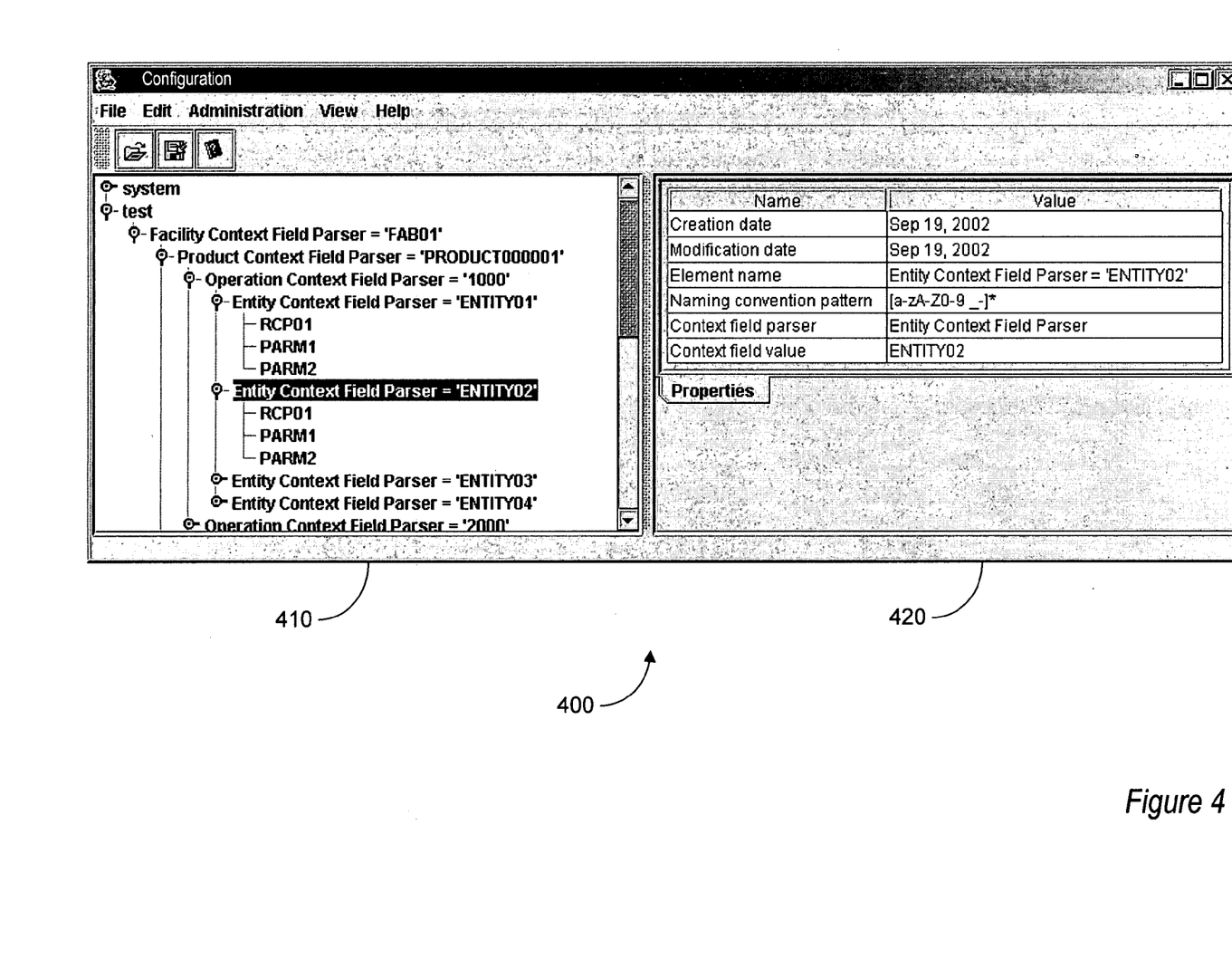
FIG. 4 shows a screen presentation of the user interface of the recipe management application.

Referring to FIG. 4, the client graphical user interface (GUI) 400 of the recipe management application 115 system is the configuration users' primary exposure to the recipe management application 115. The users of the recipe management application are generally sophisticated (e.g., process engineers and factory system setup technologists) so the client is geared toward enabling these users to rapidly accomplishing many setups quickly and accurately. Also, the interface is simple enough that a company need not designate experts who set up the system on the behalf of others.

The basic metaphor for the recipe management application 115 GUI client is a FrontPage Explorer. The main window of the application 115 includes two panes: a hierarchy pane 410 and an editing pane 420. The hierarchy pane 410 presents a tree structure which corresponds to the hierarchy of elements within in the recipe management application 115. The editing pane 420 presents an editing or properties view of the element selected in the tree of the hierarchy pane 410.

Virtually everything in the recipe management application 115 is accessible via the hierarchy pane 410 tree structure. Not just setup elements, but also portions of the application configuration, users, data sources, and such appear in the left pane tree structure. Thus, a user interface is provided with efficient process configuration which may be used from the recipe management application 115 configuration as well.

While an explorer model is good for dealing with hierarchy, regular data structures user better accessed via a spreadsheet. The recipe management application 115 client allows the user to select a folder in the hierarchy and "explode" the folder and all of the subordinate elements of the folder into a flat spreadsheet view for mass editing. The recipe management application 115 provides a traversal in which the contents of an enclosing folder are multiplied across each of subordinate elements of the folder.

If spreadsheets are already being use to represent configuration in the user domain, it is advantageous for the recipe management application 115 to allow that configuration to be imported directly from the source documents. Import from spreadsheets, XML, SQL sources, and other formats can help reduce the manual labor involved in setting up a new product or a new recipe management application installation and are thus provided within the recipe management application 115. Within the recipe management application 115, each import mechanism is a data source.

The recipe management application 115 client GUI allows the cut, copy, and paste functions users expect to see in productivity applications. These functions allow the cloning of similar processes and process steps to be a straightforward, intuitive operation.

More specifically, the recipe management application 115 solves this issue by using specifications which are no different from recipe bodies or any other element in the system. The effect of a specification containing parameter settings can be accomplished by placing the human-readable specification (the specification does not have to be ASCII text; a richer format such as Microsoft Word is perfectly acceptable) in the same folder with the parameter settings that the specification requires. This eliminates duplication of parameter settings between the human-readable specification and the recipe manager; the settings and the specification are all part of the same setup and data need not be duplicated.

To support human-readable specifications that are not downloaded to processing equipment, the element type allows configuration of whether or not elements of that type are transmitted to automated clients. There is also an API call within the recipe management application 115 that other systems can invoke to display specifications on demand. For example, specifications in the legacy system are displayed to the user at specific process steps. The recipe management application 115 allows the MES to summon the recipe management application's display of a specification at those times.

An event model within the recipe management application 115 allows users to be notified of changes within the recipe management application 115. Each user can subscribe to specific kinds of events and receive notifications via a variety of notification media. This notification allows, for example, the owner of a specification to be notified when any mini-specs of the specification are changed. It also allows appropriate visibility to undesired situations such as failure to find a recipe for a particular context.

Notification media are installed into the system via plugins. Examples of media include email, pagers, and monitor boards. Each user can be notified using any combination of the available notification media for each event type.

The event and notification model, in conjunction with security features and the data source plugin architecture, can enable a recipe management application vendor to stay informed about the application's activity and exceptions while giving the customer ultimate control of what is being transmitted. That is, the recipe management application can be enabled for e-diagnostic access.

Figure 5:
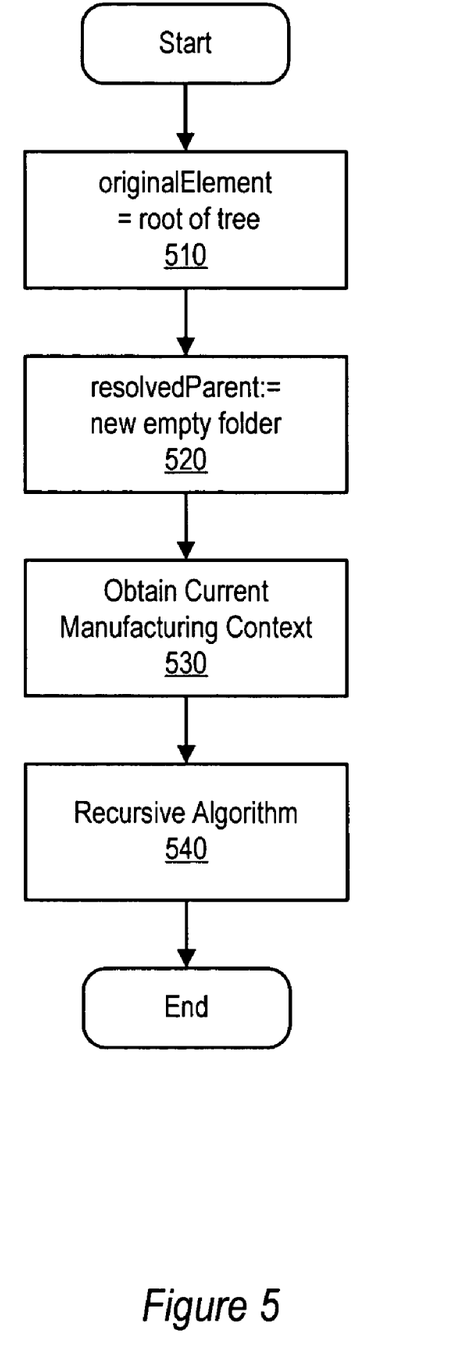
FIG. 5 shows a flow chart of a resolving algorithm of the recipe management application.

Referring to FIG. 5, a flow chart of a resolving algorithm of the recipe management application is shown. More specifically, when starting the execution of the resolving algorithm, the recipe management application obtains the root of a tree and sets the original element (originalElement) to the root of the tree at step 510. Next, the recipe management application 115 creates a new empty folder and names the folder resolved root (resolvedRoot) at step 520. Next, the recipe management application 115 obtains the current manufacturing context at step 530. The current manufacturing context is provided by whomever desires the payload (e.g., by the MES 120). Next a recursive algorithm is invoked using the original element, the resolved root and the context at step 540.

Figure 6A:
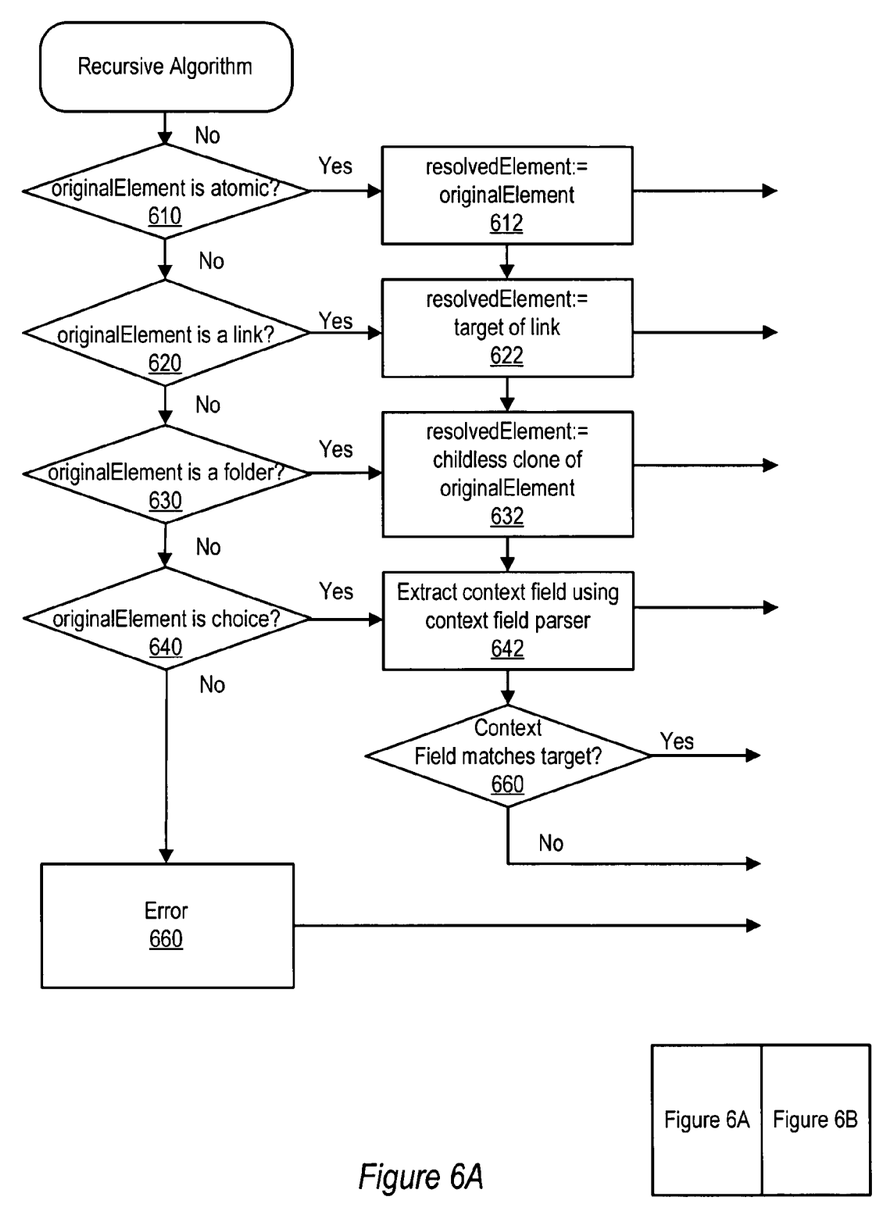
FIGS. 6A and 6B, generally referred to as FIG. 6, show a flow chart of a recursive algorithm of the resolving algorithm of the recipe management application.
Figure 6B:
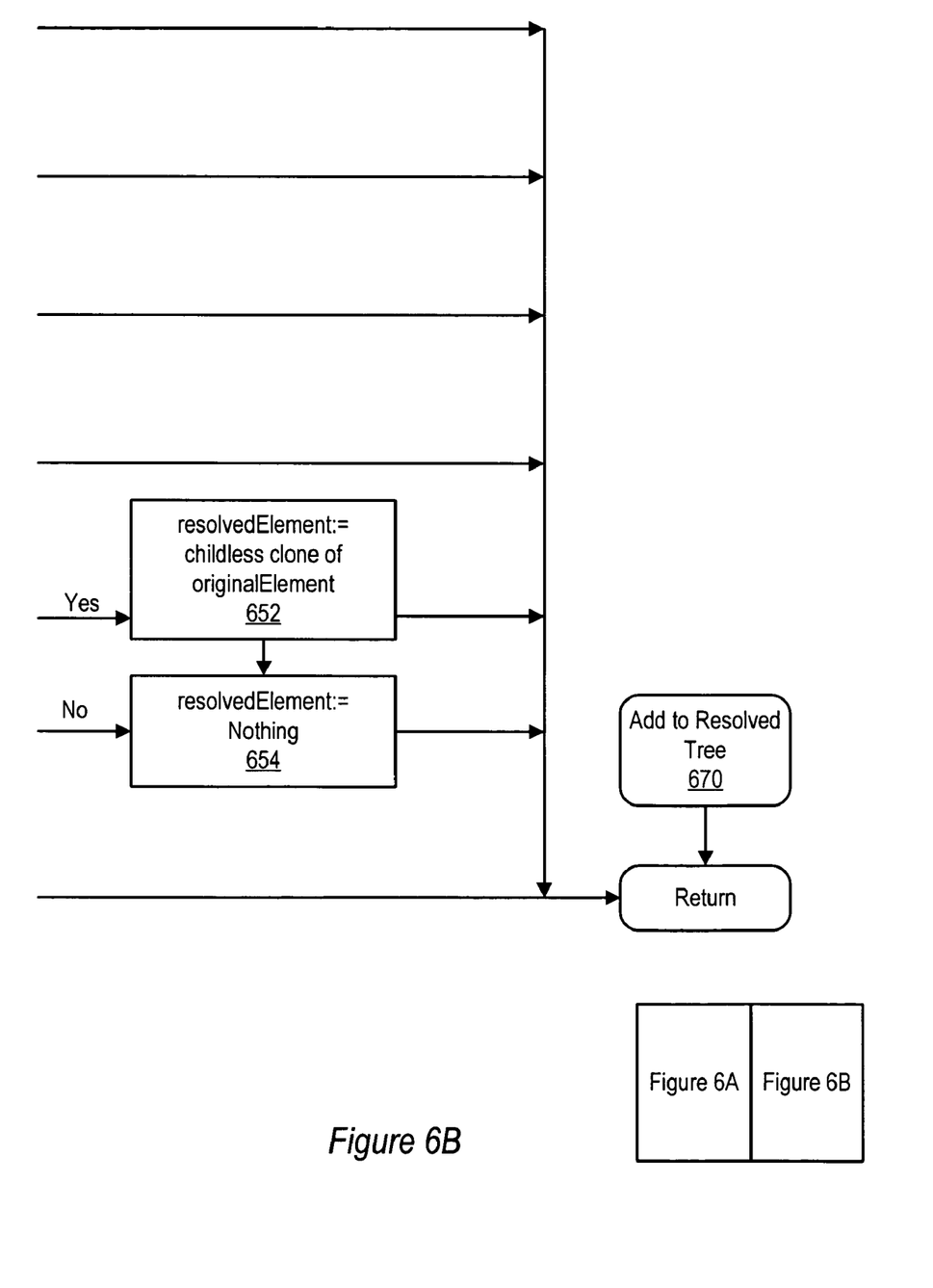

Referring to FIGS. 6A and 6B, generally referred to as FIG. 6, a flow chart of a recursive algorithm 540 of the resolving algorithm of the recipe management application 115 is shown. More specifically, if the original element is a simple atomic element, such as a recipe body or parameter, as determined by step 610, then the resolved element is set to the original element at step 612. If the original element is a link as determined by step 620, then the resolved element is set to the target of the link at step 622. (The resolved element may indicate a folder or an atomic element after step 622.) If the original element is a folder as determined by step 630, then the resolved element is set to a clone of the original element that has no children (or a new empty folder with the same name as the original element) at step 632.

If the original element is a choice as determined by step 640, then the value of the context field that the choice examines is extracted using an appropriate context field parser at step 642. If the value in the context is the same as the target value stored in the choice as determined at step 650, then the resolved element is set equal to a clone of the original element that has no children (or a new empty folder with the same name as the original element) at step 652. If the value in the context does not match the target value stored in the choice as determined at step 650, then the resolved element is set to equal nothing, indicating that this resolved element will not be present in the payload, as step 654.

After each of steps 612, 622, 632, 642, 652 and 654 execute, then the resolved element is added to the resolved tree at step 670 and the recursive algorithm 540 returns to the recipe management application 115.

Figure 7:
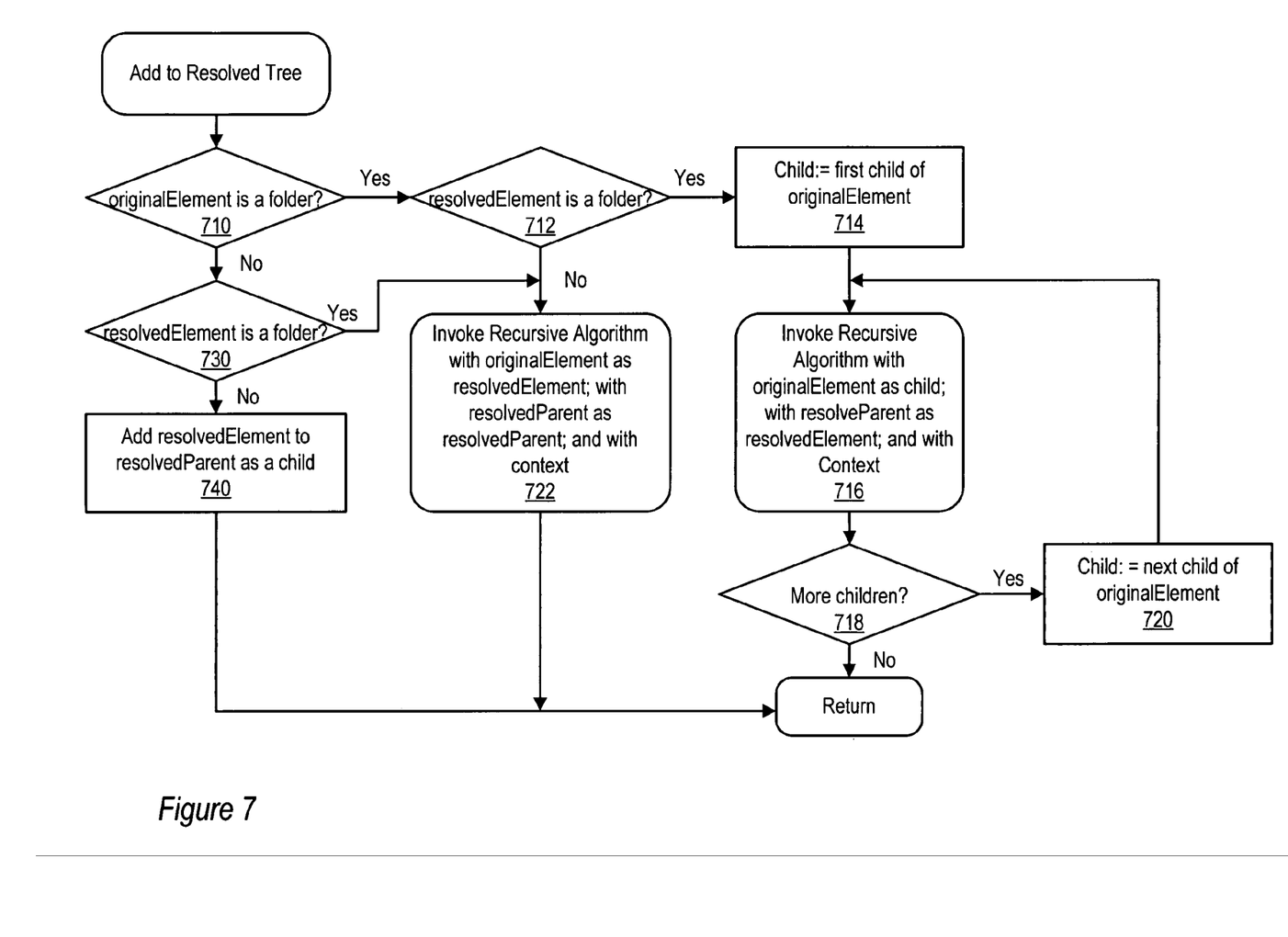
FIG. 7 shows a flow chart of an add-to resolved tree portion of the recursive algorithm.

Referring to FIG. 7, a flow chart of an add resolved element to tree portion 670 of the recursive algorithm 540 is shown. More specifically, step 710 determines whether the original element is a folder. If so, then step 712 determines whether the resolved element is a folder. If so, then the child is set to the first child of the original element at step 714 and the recursive algorithm 540 is invoked with the original element set as the child, the resolved parent set as the resolved element and with the context at step 716. After the recursive algorithm is invoked at step 716, then the tree is examined to determine whether there are any other children at step 718. If so, then the child is set to the next child in the original element at step 720 and the recursive algorithm of step 716 is again invoked. If not, then the add to resolved tree portion of the recursive algorithm returns to the recursive algorithm 540.

If the original element is a folder determined by step 710 and the resolved element is not a folder as determined at step 712, then the recursive algorithm 540 is invoked with the original element set as the resolved element, the resolved parent set as the resolved parent and with the context at step 722.

If the original element is not a folder as determined by step 710 and the resolved element is a folder as determined at step 720, then the recursive algorithm 540 is invoked with the original element set as the resolved element, the resolved parent set as the resolved parent and with the context at step 722.

If neither the original element nor the resolved element are folders as determined by steps 710 and 720, then the resolved element is added to the resolved parent as a child at step 742 and the add to resolved tree portion of the recursive algorithm returns to the recursive algorithm 540.

Figure 8:
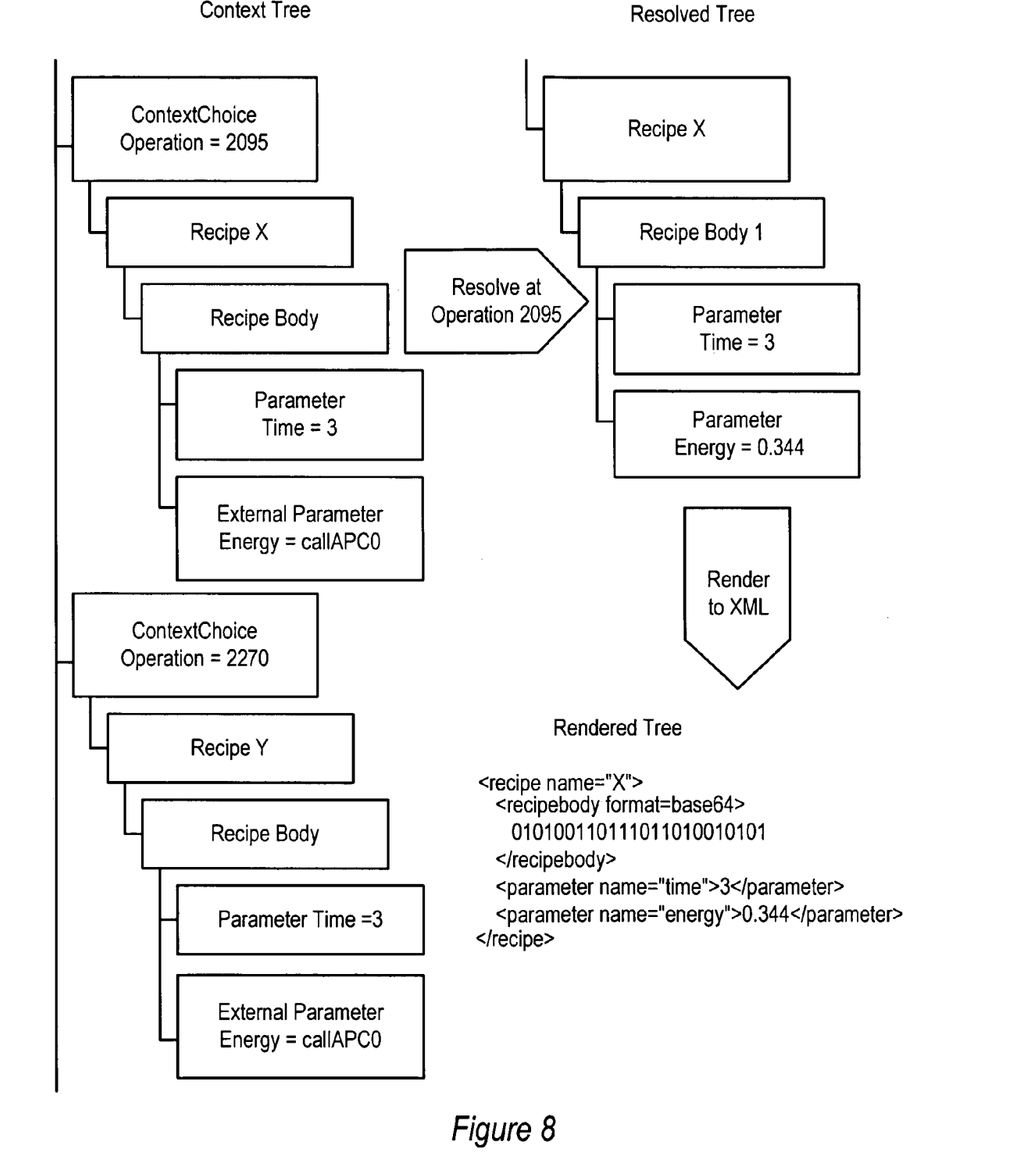
FIG. 8 shows a flow chart of an alternate operation of the resolve render process of the recipe management application.

FIG. 8 shows a flow chart of an alternate operation of the resolve render process of the recipe management application 115. In this alternate process, the flow within the resolve process via a conditioned review of the context choices as compared to the case or switch review of the context choice which is set forth in the resolve process shown in FIG. 3.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Figure 9:
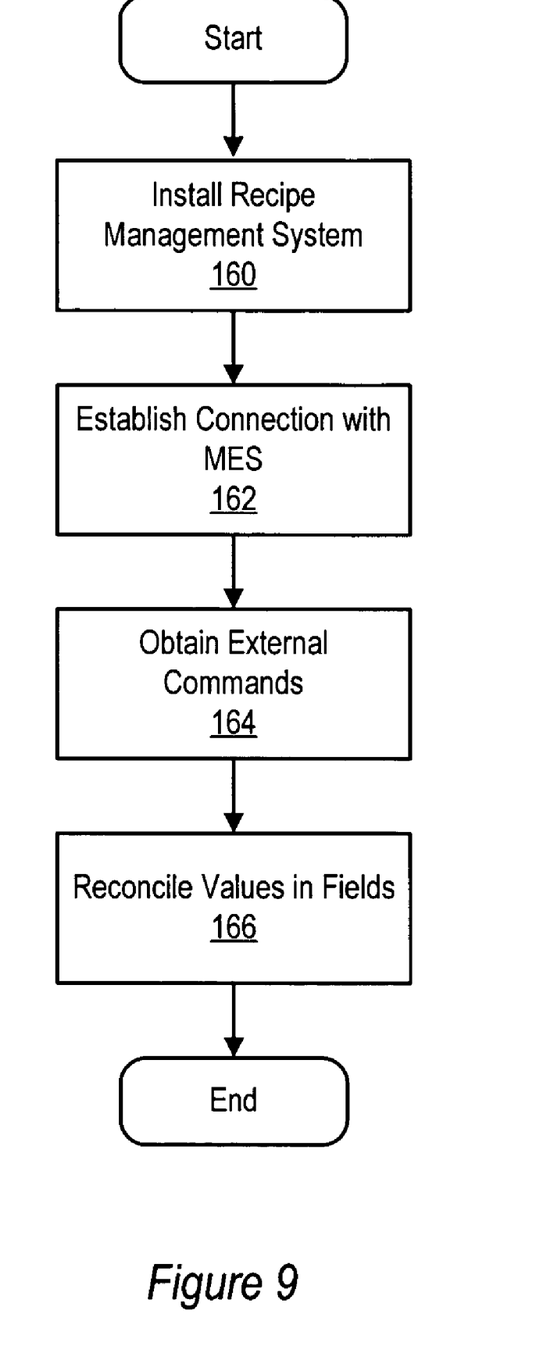
FIG. 9 is a flowchart illustration of a sequence of steps for reconciling the recipe manager and manufacturing execution system context configurations.

FIG. 9 is a generalized flowchart illustration of the integration process for reconciling recipes in the processing arrangement of the present invention. In step 160 the RMS 104 is installed and in step 162 a connection is established with the MES 120 via the bus 108. In step 164, external commands are received. The connection supports various external commands, each of which returns a list of possible values for a given process context field. The list of values may be constrained by the values in other fields of process context that are provided in the command. For example, a command might request the names of the process flows in the MES 120. Another command might request the names of the process steps that are along a particular process flow. In the latter case, the RMS 104 must provide the name of the process flow in question. The MES 120 must respond to these requests with lists of names.

When the user creates a context decision node (a choice based on a single field of context), the user may specify an external command to be used to generate the possible choices in the decision. Thus the entry of the possible values for the context decision node is completely automated and not subject to data entry error. The context decision node, after this initial population, will remember the external command that was used to populate it.

Either automatically on a periodic basis or interactively upon demand, the external command used to populate a context decision node may be run and its results compared to the possible choices already existing in the context decision node. This will result in one of three possible audit outcomes for each choice in the context decision node: 1) Present in RMS 104 and MES 120; 2) Present in RMS 104, absent from MES 120; 3) Absent in RMS 104, present in MES 120. These outcomes will hereinafter be referred to as outcome number 1, outcome number 2 and outcome number 3, respectively.

The list of choices along with their auditing outcomes is presented to the user on an audit list via the GUI 400. It is probable that the user is not interested in outcome number 1 because it signifies that all is well. Outcome number 2 presents two possibilities. When the choice in the RMS 104 has audit outcome 2 was created before the last audit and had outcome 1 in that audit this probably indicates removal of a value in the MES 120. When the outcome of the prior audit was 2 or the choice was created since the last audit, it may indicate setup in the RMS 104 that anticipates future setup in the MES 120. Because outcome number 2 does not indicate missing setup (if the choice is not in the MES 120, any setup in the RMS 104 associated with it will never be triggered), the user may not be interested in the existence of such choices.

The user always cares about choices from an audit resulting in outcome number 3, because it will cause an exception at runtime and thus the MES 120 will ask the RMS 104 for a recipe at a context unknown to the RMS 104. By reviewing the results of the audit, the user will have a facile means for determining how to synchronize the RMS 104 and the MES 120. The user is required because, in many cases, what setup should be associated with new choices cannot be inferred from the MES 120.

There are several ways to use the audit data. A report can be presented to users for choices with outcome number 3. The choices corresponding to outcome number 3 can be automatically entered into the system in a state that calls users' attention to them via the GUI 400. The setup to be associated with the automatically-created choices can be retrieved through additional integration of the data as described hereinabove. Using the results of the audit process, the context information and other related data can be disseminated via the system bus 108 between the RMS 104, the MES 120 and other system components so that the recipes and associated context information in the RMS 104 and the MES 120 are effectively synchronized.

It is well known among factory system experts that the synchronization problem described herein has been the downfall of many attempts to reform recipe management at various companies. In fact, it has been the downfall of other types of new systems as well, such as reporting engines and specification managers. The problem has typically been either ignored or addressed with complex solutions such as the "tap" solution discussed in the background section.

The approach described herein does not attempt to remove the user from the synchronization of the two systems. Instead, it focuses on detecting needed changes and directing users' attention to them in a streamlined, efficient way. This simplified approach is an "intelligently primitive" compromise solution that is both technologically efficient and productive.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention. Consequently, the invention is intended to be limited only by the spirit and scope of the appended claims, giving full cognizance to equivalents in all respects.

What is claimed is:

1. A method of manufacturing semiconductor devices using recipes in a semiconductor manufacturing process comprising:
    obtaining a first recipe having an associated defined context in a recipe management system;
    obtaining a second recipe having an associated defined context in a manufacturing execution system, said second recipe corresponding to said first recipe in said recipe management system;
    auditing said first and second recipes by comparing said first and second associated contexts;
    generating an audit list corresponding to the comparison of said first and second contexts;
    reconciling said first and second recipes based on the result of said audit list; and
    fabricating a semiconductor device using a reconciled recipe contained in said manufacturing execution system.

2. The method of claim 1 wherein said audit list contains a recipe that has a context defined in said recipe management system, but no corresponding context defined in said manufacturing execution system.

3. The method of claim 2 wherein said reconciling is accomplished by placing a context in said manufacturing execution system corresponding to the context of said recipe on said audit list.

4. The method of claim 1 wherein said audit list contains a recipe that has a context defined in said manufacturing execution system, but no corresponding context defined in said recipe management system.

5. The method of claim 4 wherein said reconciling is accomplished by placing a context in said recipe management system corresponding to the context of said recipe on said audit list.

6. The method of claim 1 wherein said auditing is initiated automatically at a predetermined time interval.

7. The method of claim 1 wherein said auditing is initiated interactively by a user.

8. The method of claim 1 wherein said auditing is initiated by an external command used to populate a context decision node.

9. A method of manufacturing semiconductor devices using a semiconductor manufacturing process comprising:
    obtaining a first set of contexts associated with a first plurality of recipes in a manufacturing execution system;
    obtaining a second set of contexts associated with a second plurality of recipes in a recipe management system;
    auditing said first and second sets of contexts to generate an audit list of contexts contained in said first list, but not in said second list;
    using said audit list to generate a reconciled set of contexts in said recipe management system;
    using said reconciled set of contexts to generate a reconciled recipe in said manufacturing system; and
    using said reconciled recipe to manufacture semiconductor devices.

10. The method of claim 9 wherein said reconciled set of contexts is generated by placing contexts on said audit list in said recipe management system.

11. The method of claim 9 wherein said auditing is initiated automatically at a predetermined time interval.

12. The method of claim 9 wherein said auditing is initiated interactively by a user.

13. The method of claim 9 wherein said auditing is initiated by an external command used to populate a context decision node.

14. A method for manufacturing recipes comprising:
    auditing a first set of contexts associated with recipes in a manufacturing execution system, thereby generating an audit list of unreconciled contexts;

reconciling said recipes by synchronizing said unreconciled contexts with a second set of contexts contained in a recipe management system; and fabricating a semiconductor device using a reconciled recipe contained in said manufacturing execution system.

15. The method of claim 14 wherein the auditing is initiated automatically by an external command used to populate a context decision node.

16. The method of claim 14 wherein the auditing is initiated interactively by a user.

17. An apparatus of manufacturing semiconductors using a semiconductor manufacturing process comprising:

means for auditing a first set of contexts in a manufacturing execution system;

means for auditing a second set of contexts in a recipe management system;

means for reconciling said first set of contexts and said second set of contexts to generate a set of reconciled contexts in said manufacturing execution system;

means for generating a set of reconciled recipes using said set of reconciled contexts; and means for manufacturing semiconductors using said set of reconciled recipes.

18. The apparatus of claim 17, said means for auditing being initiated automatically on a periodic basis.

19. The apparatus of claim 17, said means for auditing being initiated interactively by a user.

20. The apparatus of claim 17, said means for initiating said audit being responsive to an external command used to populate a context decision node.

* * * * *